(12) United States Patent
Liebhardt et al.

(10) Patent No.: US 8,534,453 B2
(45) Date of Patent: Sep. 17, 2013

(54) DEVICE FOR TRANSPORTING UPRIGHT CONTAINERS IN A STRAIGHT LINE

(75) Inventors: Juergen Liebhardt, Laupheim (DE); Michael Kronawitter, Beimerstetten (DE); Ralf Heim, Laupheim (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 64 days.

(21) Appl. No.: 13/369,744

(22) Filed: Feb. 9, 2012

(65) Prior Publication Data
US 2012/0222941 A1    Sep. 6, 2012

(30) Foreign Application Priority Data
Mar. 4, 2011 (EP) .................................... 11157022

(51) Int. Cl.
*B65G 25/08* (2006.01)
(52) U.S. Cl.
USPC ......... 198/748; 198/741; 198/736; 198/419.3
(58) Field of Classification Search
USPC ............... 198/736–739, 741, 747, 748, 419.3
See application file for complete search history.

(56) References Cited

U.S. PATENT DOCUMENTS

| | | | | |
|---|---|---|---|---|
| 213,695 A | * | 3/1879 | Sanford | 198/737 |
| 2,601,785 A | * | 7/1952 | Pottle | 73/863.92 |
| 3,332,539 A | * | 7/1967 | Buchheit | 198/741 |
| 3,499,524 A | * | 3/1970 | Milazzo | 198/718 |
| 4,039,073 A | | 8/1977 | Ohlhaver | |
| 4,147,249 A | * | 4/1979 | Tourres | 198/459.1 |
| 4,231,688 A | * | 11/1980 | Wolf | 406/76 |
| 4,306,401 A | * | 12/1981 | Stohlquist et al. | 53/564 |
| 4,466,532 A | * | 8/1984 | Minneman et al. | 198/468.01 |
| 4,853,115 A | * | 8/1989 | Kennel et al. | 209/173 |
| 5,657,615 A | * | 8/1997 | Muller | 53/448 |
| 6,360,873 B1 | * | 3/2002 | Bonnain et al. | 198/419.3 |
| 6,889,485 B2 | * | 5/2005 | Davaillon | 53/443 |
| 8,074,788 B2 | * | 12/2011 | Tachibana | 198/781.05 |

FOREIGN PATENT DOCUMENTS

DE  1221570  7/1966
WO  WO 01/70570 A1  9/2001

OTHER PUBLICATIONS

EP Search Report for EP 11157022 dated Aug. 11, 2011.

* cited by examiner

*Primary Examiner* — Mark A Deuble
(74) *Attorney, Agent, or Firm* — Brinks Hofer Gilson & Lione

(57) ABSTRACT

The device for transporting upright containers in a straight line includes a rake conveyor comprising multiple receiving sections for the containers and an opposing support element for the containers carried in the receiving sections. The rake conveyor is connected to two drives by at least two pivot systems, each with two arms, in such a way that the rake conveyor can be pushed back and forth both in the transport direction of the containers and also in the direction perpendicular to the transport direction of the containers.

14 Claims, 4 Drawing Sheets

DEVICE FOR TRANSPORTING UPRIGHT CONTAINERS IN A STRAIGHT LINE

RELATED APPLICATIONS

The present patent document claims the benefit of priority to European Patent Application No. EP 11157022.2, filed Mar. 4, 2011, and entitled "DEVICE FOR TRANSPORTING UPRIGHT CONTAINERS IN A STRAIGHT LINE" the entire contents of each of which are incorporated herein by reference.

FIELD AND BACKGROUND

The present invention relates to a device for transporting upright containers in a straight line.

In the pharmaceutical industry, upright containers such as small bottles of plastic or some other suitable material are filled with tablets, capsules, or coated pills; covered with cotton; and sealed with caps at various stations. Before, between, and after the stations, the containers are moved forward in various ways by transport devices, either continuously or intermittently.

Examples of these types of transport devices include screw conveyors, which move the containers along continuously. In this case the containers are held in the grooves in the screw and travel along with the movement of the screw. Either two screws must be provided, which rotate in opposite directions but at the same speed and which hold the containers between them, or only a single screw can be provided, which is arranged adjacent to a smooth opposing support surface, wherein the containers are held between the screw and the opposing support surface and slide along the opposing support surface. An example of a corresponding screw conveyor is known from EP 2 006 204 A1.

One of the problems with screw conveyors is that intermittent operation, which is, for example, advantageous for the filling of containers, is not possible. In addition, when the format of the transported containers is to be changed, the screws, which are themselves format-dependent components, must be replaced, or at least the distance between the two screws or between the screw and the opposing support surface must be readjusted.

BRIEF SUMMARY

It is an object of the present invention to provide a device for transporting upright containers in a straight line which is simple in design, which can be used for intermittent operation, and which can be adjusted flexibly to accommodate containers of different sizes.

According to an aspect of the invention, the device for transporting upright containers in a straight line in a transport direction comprises a rake conveyor, which comprises, on a first long side, several receiving sections for the containers, which are arranged next to each other in a row in the transport direction and are open in a direction transverse to the transport direction; and an opposing support element for the containers carried in the receiving sections. The opposing support element comprises a support surface, which extends in the transport direction and which is arranged opposite the first long side of the rake conveyor. The rake conveyor is connected by at least two pivot systems to a first drive and a second drive, wherein each pivot system comprises a first arm and a second arm, each of which are connected in stationary but rotatable manner to the rake conveyor at a first connecting point of the first arm and at a first connecting point of the second arm, respectively. The first arm is, at a second connecting point, rotatably connected to a first shifting element, which can be shifted back and forth in a straight line in the transport direction by the first drive, and the second arm is, at a second connecting point, rotatably connected to a second shifting element, which can be shifted back and forth in a straight line in the transport direction by the second drive. The first shifting element and the second shifting element are driven by the first drive and the second drive so as to execute either identical movements in the same direction or a relative movement with respect to each other, so that the rake conveyor can be shifted back and forth both in the transport direction of the containers and in the direction perpendicular to the transport direction.

In this way, a device is created which ensures the intermittent movement of the containers in a simple manner and which can also be adjusted easily to accommodate containers of different formats.

The movement of the rake conveyor by which the containers are transported in the transport direction and then the movement in the direction opposite the transport direction by which the rake conveyor is returned to its starting point to pick up a new set of containers can be produced by shifting the first and second shifting elements in identical fashion, i.e., in the same direction at the same speed. In this way, the containers carried in the receiving sections of the rake conveyor are moved forward uniformly, and the return trip of the empty rake conveyor also proceeds uniformly.

Conversely, the rake conveyor can be conveyed in the direction perpendicular to the transport direction between a closed position and an open position of the rake conveyor by shifting the first and second shifting elements in different ways.

By shifting the first and second shifting elements in different ways, the first and second arms are moved relative to each other in the area of the second connecting points, that is, toward or away from each other, as a result of which the rake conveyor is displaced laterally. Ideally, the shifting of the first and second shifting elements in different ways consists in shifting them in opposite directions and over the same distance, as a result of which the second connecting points move symmetrically away from each other or symmetrically toward each other.

In the closed position of the rake conveyor, the second connecting points of the first and second arms preferably lie closer together than when the rake conveyor is in the open position. When in its closed position, therefore, the rake conveyor is closer to the opposing support surface than when it is in its open position.

In a preferred embodiment, the first and second arms can be essentially straight and can enclose between them an angle which opens out toward the second connecting points. In this way, a design is created which has a simple and stable structure and which makes it easy to control the movement of the rake conveyor transversely to the transport direction. In addition, this angle geometry ensures the stability of the rake conveyor during rapid transport of the containers.

The angle is preferably in the range of 50-80° in the closed position and in the range of 70-100° in the open position, wherein the angle in the open position is preferably always larger than the angle in the closed position These angles have proven to be especially stable structurally in the sense that sufficient stiffness and sturdiness are present even at high speeds both for the outbound trip of the fully loaded rake conveyor in its closed position and for the return trip of the empty rake conveyor in its open position.

In a preferred embodiment, the first shifting element comprises a first pushrod and the second shifting element comprises a second pushrod. These pushrods, which are arranged parallel to each other, make it possible to adjust simultaneously the at least two pivot systems, which are arranged a considerable distance apart, in that, although each pivot system is connected to the same pushrods, it is connected to different attachment points on them.

A relatively simple but at the same time accurate mechanism for transferring the force of the drive to the pushrods is achieved in that the first pushrod is mounted by first connecting means on an endless first belt, which is driven by the first drive, and in that the second pushrod is mounted by second connecting means on an endless second belt, which is driven by the second drive.

To ensure the reliable guidance of the pivot systems, a first slide, which is rigidly connected to the first pushrod and rotatably connected to each first arm, is arranged preferably between the first arm and the first pushrod. Similarly, a second slide, which is rigidly connected to the second pushrod and rotatably connected to each second arm, is preferably arranged between the second arm and the second pushrod.

The first slide and the second slide can either be guided in two different guideways extending parallel to the transport direction, or they can both be guided in the same guideway extending in the transport direction. The latter offers the advantage that symmetrical arm arrangements can be used and less depth is required.

The pivot systems and thus the rake conveyor can be actuated in the most precise and reliable possible way by using servomotors for the first and second drives.

The device is adapted to accommodate containers of different sizes, if the rake conveyor can be adjusted transversely to the transport direction, and it is also advantageous for the receiving sections to be recesses of substantially triangular shape, which widens out toward the opposing support element.

An angle in the range of 90-110° between the two side walls of the recesses has been found to be especially advantageous.

BRIEF DESCRIPTION OF THE DRAWINGS

Additional details and advantages of the present invention can be derived from the following description, which refers to the drawings.

DETAILED DESCRIPTION OF SPECIFIC EMBODIMENTS

Figure 1:
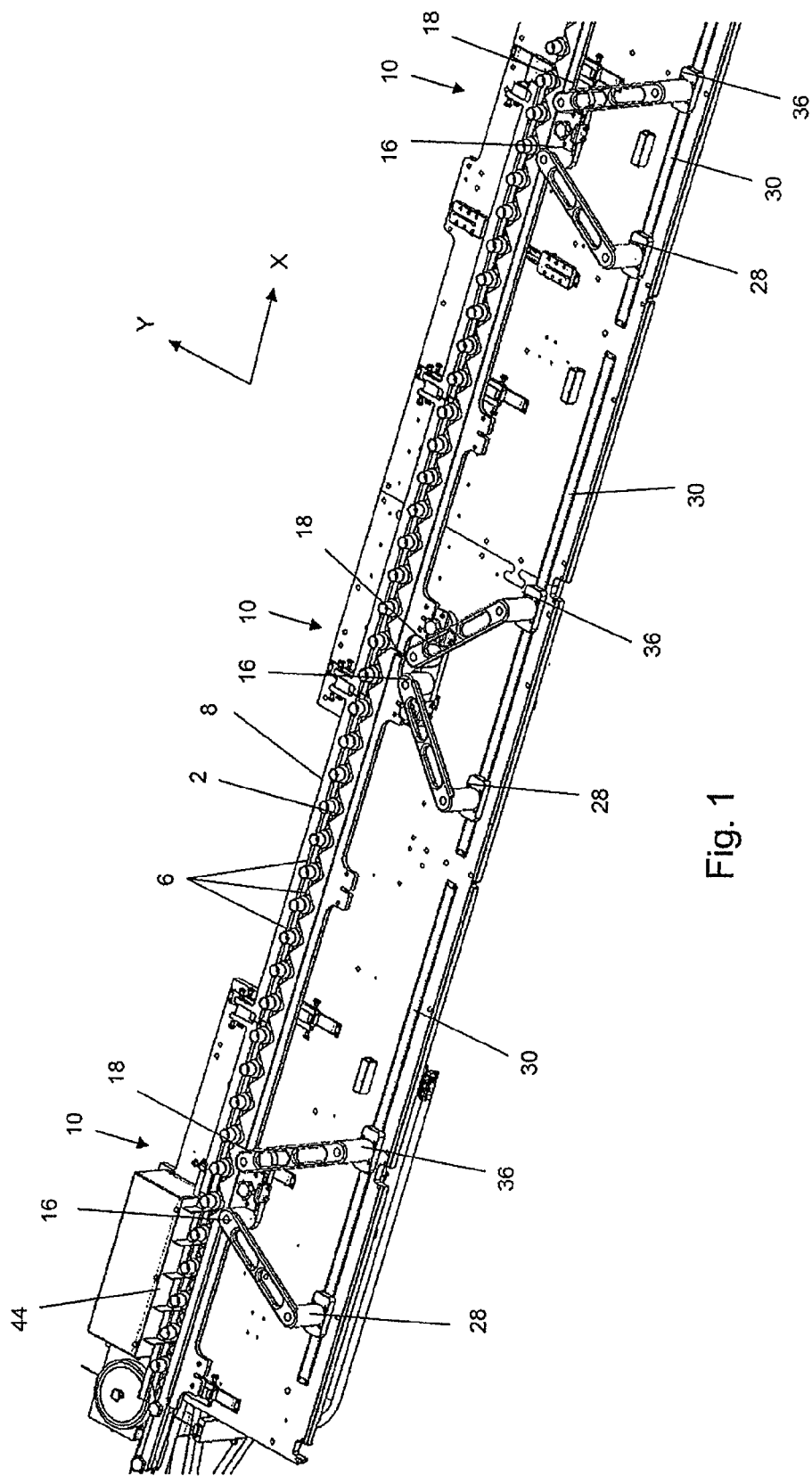
FIG. 1 is a perspective schematic diagram of a preferred embodiment of the device for transporting upright containers in a straight line according to the invention.
Figure 2:
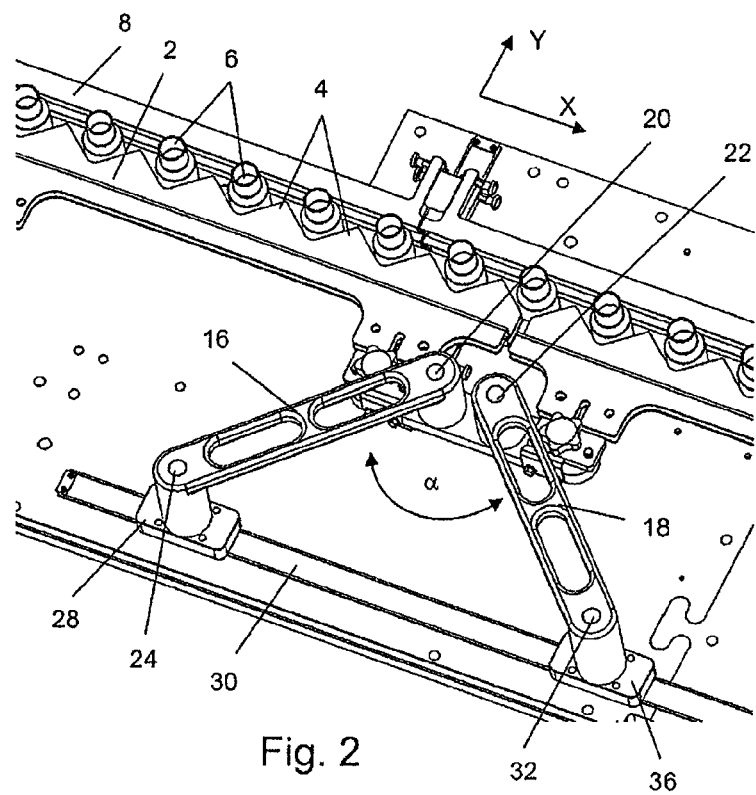
FIG. 2 is a perspective schematic diagram of a section of the embodiment of FIG. 1 with the rake conveyor in a closed position.
Figure 3:
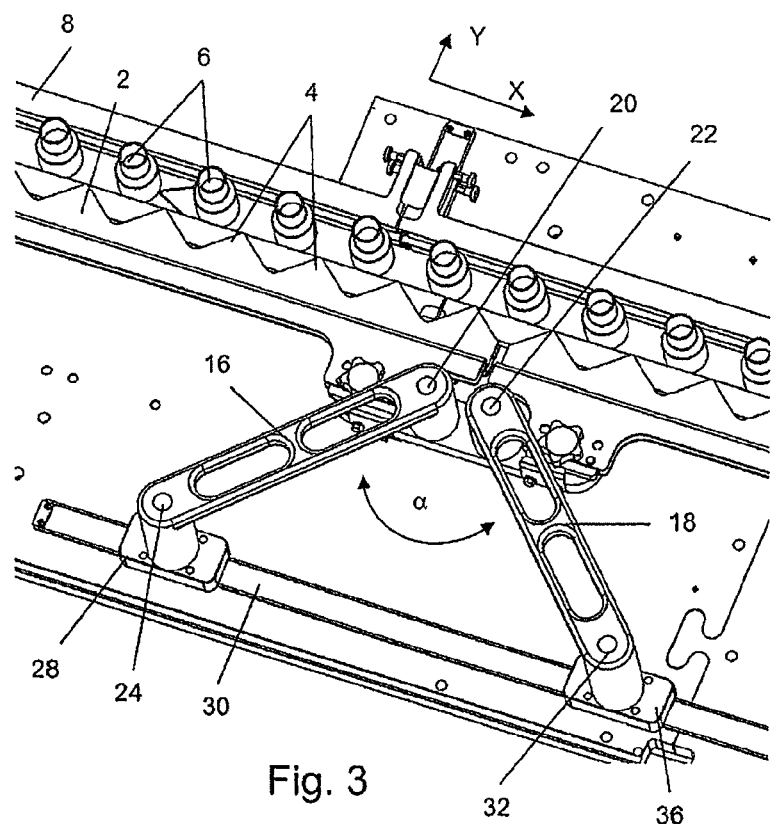
FIG. 3 is a perspective schematic diagram of a section of the embodiment of FIG. 1 with the rake conveyor in an open position.

FIGS. 1-7 show a preferred embodiment of a device for transporting upright containers in a straight line according to the invention. The containers are standing on a support surface (not shown), preferably a sliding surface, or on an intermittently actuated conveyor belt.

The device comprises a rake conveyor 2, which comprises, on a first long side, multiple receiving sections 4 for the containers 6. The receiving sections 4 are arranged next to each other in a row in the transport direction (arrow "X") and are open toward the outside. The containers 6 can be made of various materials. The receiving sections 4 are preferably substantially triangular, widening out toward the outside, as a result of which the rake conveyor 2 can be used flexibly for containers 6 of different sizes and shapes. The two side walls of the receiving sections 4 preferably enclose an angle in the range of 90-100°. It is also possible for the receiving sections 4 to be specially adapted to the shape of the containers 6 and thus to have a shape deviating from the triangular such as an oval or polygonal shape.

To ensure that the containers 6 are guided securely by the rake conveyor 2, an opposing support element 8 is provided for the containers 6 carried in the receiving sections 4. The support element 8 comprises a support surface, which extends in the transport direction and is set up opposite the first long side of the rake conveyor 2. The support surface of the opposing support element 8 is preferably made of low-friction material and is completely flat.

The rake conveyor 2 can consist of one or several parts, is preferably made of high-grade sheet steel, and is connected to a first drive 12 and a second drive 14 by at least two pivot systems 10 or, as in the case of the present example, by three such systems. Each pivot system 10 comprises a first arm 16 and a second arm 18, preferably of aluminum, each of which is connected rotatably to the rake conveyor 2 at a first connecting point 20 for the first arm 16 and at a first connecting point 22 for the second arm 18. In spite of the freedom of the arms 16, 18 to rotate around the first connecting points 20, 22, the two first connecting points 20, 22 are stationary with respect to the rake conveyor 2. The connecting points 20, 22 are preferably located at one end of the arms 16, 18.

In the example shown here, the two first connecting points 20, 22 are relatively close together, but many other geometries are possible. For example, the two first connecting points 20, 22 could define a common rotational axis, or the first connecting points 20, 22 could be arranged at a greater distance from each other or be offset from each other transversely to the transport direction.

In the example shown here, the first and second arms 16, 18 are substantially straight and have identical dimensions. Arms 16, 18 of nearly any other shape could also be used in accordance with the invention.

The first arm 16 is connected rotatably to a first shifting element at a second connecting point 24. This shifting element can be shifted back and forth in a straight line in the transport direction by the first drive 12. In the embodiment shown here, the first shifting element comprises a first pushrod 26 and a first slide 28, but other designs could also be used.

In the example shown here, the connection between the first arm 16 and the first pushrod 26 is not direct but achieved rather by the intermediate presence of the first slide 28, which is guided in a guideway 30 extending in the transport direction. For its own part, the first slide 28 is rigidly connected to the first pushrod 26 and rotatably connected to the first arm 16.

The second arm 18 is rotatably connected in identical fashion at a second connecting point 32 to a second shifting element, which, in the embodiment shown here, comprises a second pushrod 34 and a second slide 36. Here again, the second arm 18 is rotatably connected to the second slide 36, which is rigidly connected in turn to the second pushrod 34. The second slide 36 is also guided in the guideway 30, but it could also be guided in a separate guideway. In this other embodiment, not shown here, the first slide 28 and the second slide 36 would then be guided along two guideways 30 extending parallel to each other in the transport direction, and the arms 16, 18 would be of different length.

The two connecting points 24, 32 are preferably located at the other end of the arms 16, 18, i.e., the end opposite the first end.

Figure 4:
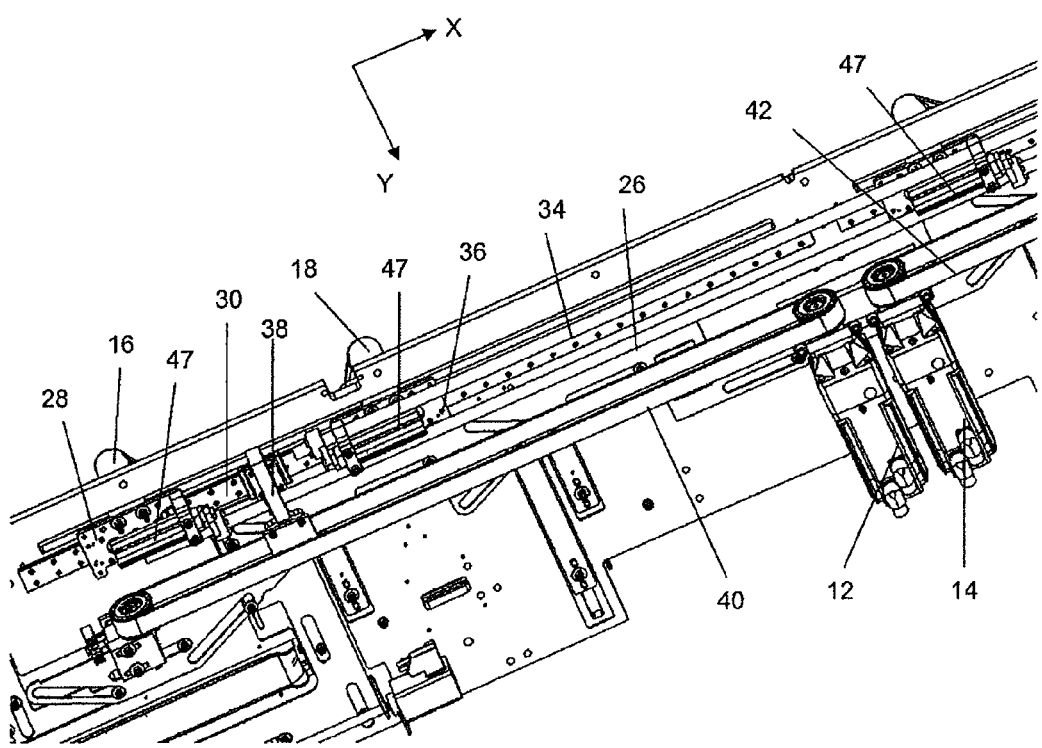
FIG. 4 is a perspective schematic diagram from below, of a section of the drive assembly of the embodiment according to FIG. 1.

As can best be seen in FIG. 4, the first pushrod 26 is mounted on an endless first belt 40 by first connecting means 38, which, in the present case, are in the form of connecting clamps. This first belt 40 is driven by the first drive 12. The second pushrod 34 is also mounted on an endless second belt 42 by second connecting means (not shown), This belt 42 is driven by the second drive 14. There are obviously a few other possibilities which could be considered by the person skilled in the art for connecting the pushrods 26, 34 to the drives 12, 14. The two drives 12, 14 are preferably designed as servomotors to ensure the precise control of the back-and-forth movement of the two pushrods 26, 34.

In the preferred embodiment shown here with two arms 16, 18 of equal length, the two arms 16, 18 enclose between them an angle α, which opens out in the direction toward the second connecting points 24, 32. In the closed position of the rake conveyor 2 shown in FIG. 2, this angle α is in the range of 50-80°, and in the open position of the rake conveyor 2 shown in FIG. 3, this angle α is in the range of 70-100°, wherein the angle α is always greater in the open position than it is in the closed position.

This means in other words that the two slides 28, 36 are pushed closer together to produce the closed position of the rake conveyor 2, whereas they are pushed farther apart to achieve the open position of the rake conveyor 2. Through the kinematics of levers, a back-and-forth movement of the rake conveyor 2 transversely to the transport direction, i.e., in the direction of the arrow Y, is produced by the shifting of the two pushrods 26, 34 relative to each other.

The operation of the device will now be described with reference to FIG. 1. First, a series of containers 6 are made available at the correct distance apart in a feed station 44. The rake conveyor 2 is then moved into the closed position, as a result of which the containers 6 are nested into the holders or receiving sections 4 of the rake conveyor 2 and guided on the opposite side by the opposing support element 8. As a result of the uniform movement of the two drives 12, 14, during which the positioning of the first and second arms 16, 18 of each pivot system 10 is maintained, the rake conveyor 2 is moved a predetermined distance in the transport direction X, as a result of which the containers 6 are carried along by the same amount.

When the desired intermediate position is reached, the rake conveyor 2 is moved from the closed position back into the open position, in that the two pushrods 26, 34 are moved in opposite directions. While remaining in this open position shown in FIG. 3, the rake conveyor 2 is then returned to the feed station 44 by moving the two pushrods 26, 34 back in the same direction at the same speed to their starting point. Then the circuit begins again from the beginning, the rake conveyor 2 first being moved from the open position into the closed position. Thus the containers 6 are transported step by step from the feed station 44 to a discharge station (not shown). The maximum transport distance is determined by the length of the rake conveyor 2.

In addition to the symmetrical arrangement of the two arms 16, 18 shown here, it would also be possible to conceive of many nonsymmetrical arrangements. For example, one arm 16, 18 could be shorter than the other arm 16, 18; or the two arms 16, 18 could, for example, be guided by slides 28, 36 traveling along opposite sides of the transport path for the containers 6. In this case, the two arms 16, 18 would enclose a larger angle between them.

The design with three pivot systems 10 shown here is highly suitable for an overall length of the rake conveyor 2 of about four meters. Depending on the length of the rake conveyor 2, however, it may be necessary to have more pivot systems 10. In any case, however, at least two pivot systems 10 will always be needed.

Figure 5:
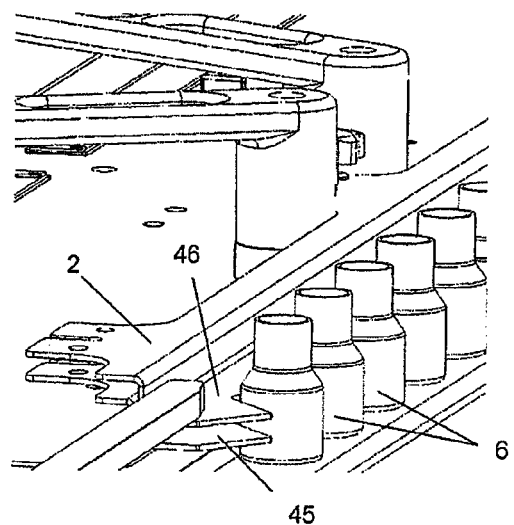
FIGS. 5-7 are perspective schematic diagrams of a section of the rake conveyor showing different embodiments of the receiving sections.
Figure 6:
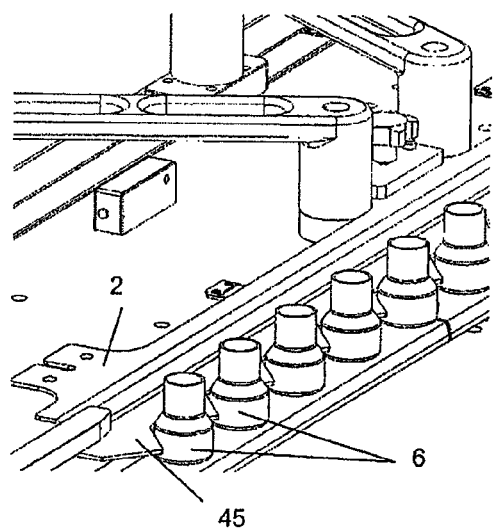
Figure 7:
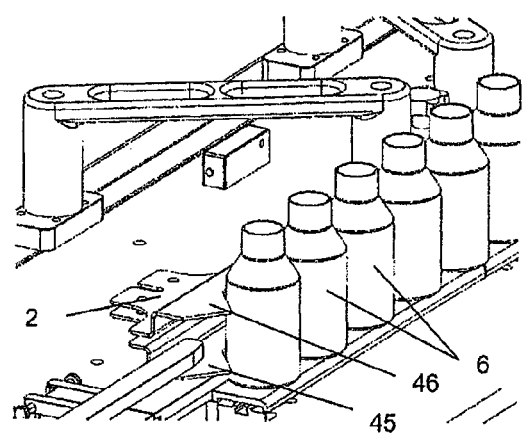

It can be seen from FIG. 5 that the receiving sections 4 or holders can be formed by an upper half 46 and a lower half 45 of the rake conveyor 2. For smaller containers 6, the upper part 46 can be removed entirely (see FIG. 6), but it could also be installed upside down in the case of larger containers 6 to grip the upper part of the containers 6 (see FIG. 7).

Finally, as can be seen in FIG. 4, a resilient element 47, preferably a pneumatic spring, can be arranged between the pushrod 26, 34 and the slide 28, 36 to protect the rake conveyor 2 and its drive elements. Thus any overload which may occur as a result of jammed containers 6 can be buffered before the drives 12, 14 are turned off automatically.

With this design, it is possible to transport 150 containers per minute in intermittent fashion. The timing of the intermittent movements can also be varied to achieve different transport rates for containers of different sizes and shapes.

The invention claimed is:

1. A device for transporting upright containers in a straight line in a transport direction, comprising:
   a rake conveyor, which comprises, on a first long side thereof, several receiving sections for the containers arranged next to each other in a row in the transport direction; and
   an opposing support element to support the containers carried in the receiving sections, the support element comprising a support surface extending in the transport direction and arranged opposite the first long side of the rake conveyor, the receiving sections of the rake conveyor open towards the support element;
   wherein the rake conveyor is connected to a first drive and to a second drive by at least two pivot systems;
   wherein each of the at least two pivot systems comprises a first arm and a second arm, the first arm connected stationarily but rotatably to the rake conveyor at a first connecting point of the first arm, and the second arm connected stationarily but rotatably to the rake conveyor at a first connecting point of the second arm;
   wherein each first arm is, at a second connecting point of the first arm, rotatably connected to a first shifting element which is movable back and forth in a straight line in the transport direction by means of the first drive;
   wherein each second arm is, at a second connecting point of the second arm, rotatably connected to a second shifting element which is movable back and forth in a straight line in the transport direction by means of the second drive; and
   wherein the first drive and the second drive are adapted to either drive the first shifting element and the second shifting element in a same direction for identical movement, or to drive the first shifting element and the second shifting element differently for relative movement with respect to each other, the rake conveyor thus being movable back and forth both in the transport direction of the containers and in a direction perpendicular to the transport direction of the containers.

2. The device of claim 1 wherein the movement of the rake conveyor in the transport direction to transport the containers and the movement in a direction opposite the transport direction to return the empty rake conveyor to pick up a new set of containers is achievable by shifting the first shifting element and the second shifting element identically.

3. The device of claim 2 wherein the movement of the rake conveyor in the direction perpendicular to the transport direction between a closed position and an open position of the rake conveyor is achievable by shifting the first shifting element and the second shifting element differently.

4. The device of claim 3 wherein the second connecting point of the first arm and the second connecting point of the second arm of each pivot system lie closer to each other in the closed position of the rake conveyor than in the open position of the rake conveyor.

5. The device of claim 4 wherein the first arm and the second arm of each pivot system extend substantially in a straight line and enclose an angle which opens out in a direction toward the second connecting points of the first and second arms.

6. The device of claim 5 wherein the angle is in the range of 50-80° in the closed position of the rake conveyor and in the range of 70-100° in the open position of the rake conveyor, wherein the angle is always larger in the open position of the rake conveyor than in the closed position of the rake conveyor.

7. The device of claim 1 wherein the first shifting element comprises a first pushrod and the second shifting element comprises a second pushrod.

8. The device of claim 7 wherein the first pushrod is mounted by first connecting means on an endless first belt connected to the first drive, and the second pushrod is mounted by second connecting means on an endless second belt connected to the second drive.

9. The device of claim 8 wherein, between the first arm of each pivot system and the first pushrod, a first slide is arranged, which is rigidly connected to the first pushrod and rotatably connected to the first arm, and wherein, between the second arm of each pivot system and the second pushrod, a second slide is arranged, which is rigidly connected to the second pushrod and rotatably connected to the second arm.

10. The device of claim 9 wherein the first slide and the second slide are guided in two different guideways extending parallel to each other in the transport direction.

11. The device of claim 9 wherein the first slide and the second slide are guided in a same guideway extending in the transport direction.

12. The device of claim 1 wherein the first drive and the second drive are servomotors.

13. The device of claim 1 wherein the receiving sections are substantially triangular recesses, which widen out toward the opposing support element.

14. The device of claim 13 wherein two side walls of each recess enclose an angle of 90-100° between them.

* * * * *